(12) United States Patent
Griesmer

(10) Patent No.: US 12,058,138 B2
(45) Date of Patent: Aug. 6, 2024

(54) SECURING CORPORATE ASSETS IN THE HOME

(71) Applicant: AT&T Intellectual Property I, L.P., Atlanta, GA (US)

(72) Inventor: Stephen Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 402 days.

(21) Appl. No.: 17/462,614

(22) Filed: Aug. 31, 2021

(65) Prior Publication Data

US 2023/0063962 A1 Mar. 2, 2023

(51) Int. Cl.
| | |
|---|---|
| H04L 9/40 | (2022.01) |
| G06F 8/65 | (2018.01) |
| G06Q 10/1093 | (2023.01) |
| G06Q 30/018 | (2023.01) |
| H04L 12/28 | (2006.01) |
| H04L 12/66 | (2006.01) |
| H04L 67/00 | (2022.01) |

(52) U.S. Cl.
CPC .............. *H04L 63/101* (2013.01); *G06F 8/65* (2013.01); *G06Q 10/1093* (2013.01); *G06Q 30/018* (2013.01); *H04L 12/2803* (2013.01); *H04L 12/66* (2013.01); *H04L 67/34* (2013.01)

(58) Field of Classification Search
CPC .. G06F 21/44; G06F 21/577; G06F 2221/034; G06F 8/65; G06Q 10/1093; G06Q 30/018; H04L 12/2803; H04L 12/2834; H04L 12/66; H04L 63/101; H04L 67/34
See application file for complete search history.

(56) References Cited

U.S. PATENT DOCUMENTS

| | | | | |
|---|---|---|---|---|
| 7,546,629 B2 * | 6/2009 | Albert | ................ | H04L 12/2876 726/13 |
| 7,779,071 B2 * | 8/2010 | Lor | ...................... | H04L 63/108 709/224 |
| 7,929,528 B2 * | 4/2011 | Henry | ................ | H04L 61/2564 370/328 |

(Continued)

OTHER PUBLICATIONS

Westcott et al.; "Build it and they will embrace it Consumers are preparing for 5G connectivity in the home and on the go"; Deloitte Center for Technology, Media & Telecommunications; © 2019; 18 pages.

(Continued)

*Primary Examiner* — Sharon S Lynch
(74) *Attorney, Agent, or Firm* — Guntin & Gust, PLC; Miyoung Shin

(57) ABSTRACT

A method includes creating a secured connection between a home network and a remote corporate network via a smart home gateway; detecting a plurality of devices are connected with the smart home gateway, wherein the plurality of devices are within the home network; determining that a first device of the plurality of devices is indicated as an authorized corporate device; determining that the first device has software updated to a threshold version of software; and based on the indication that the first device is an authorized corporate device or the first device has software update to the threshold version of software, automatically connecting the first device to the remote corporate network.

20 Claims, 4 Drawing Sheets

(56) References Cited

U.S. PATENT DOCUMENTS

| | | | | |
|---|---|---|---|---|
| 8,286,002 B2* | 10/2012 | Kamat | H04W 12/03 | 713/192 |
| 8,479,279 B2* | 7/2013 | Li | G06F 21/33 | 726/1 |
| 8,869,235 B2* | 10/2014 | Qureshi | H04L 67/10 | 713/153 |
| 8,886,925 B2* | 11/2014 | Qureshi | H04L 63/0428 | 713/150 |
| 8,910,241 B2* | 12/2014 | Pollutro | G06F 21/6218 | 726/13 |
| 9,137,262 B2* | 9/2015 | Qureshi | H04L 9/0822 | |
| 9,143,529 B2* | 9/2015 | Qureshi | H04L 9/0825 | |
| 9,143,530 B2* | 9/2015 | Qureshi | H04L 9/0891 | |
| 9,148,435 B2* | 9/2015 | Hoyos | H04L 9/40 | |
| 9,183,380 B2* | 11/2015 | Qureshi | H04W 12/37 | |
| 9,286,471 B2* | 3/2016 | Qureshi | G06F 8/53 | |
| 9,332,019 B2* | 5/2016 | Hoyos | H04L 63/105 | |
| 9,378,359 B2* | 6/2016 | Qureshi | G06F 21/6218 | |
| 9,529,996 B2* | 12/2016 | Qureshi | H04W 12/06 | |
| 9,781,114 B2* | 10/2017 | Pollutro | G06F 21/335 | |
| 10,044,757 B2* | 8/2018 | Qureshi | H04W 4/02 | |
| 10,063,595 B1* | 8/2018 | Qureshi | H04L 63/0471 | |
| 10,129,242 B2* | 11/2018 | DeWeese | H04L 63/10 | |
| 10,243,953 B2* | 3/2019 | Kus | H04L 63/0876 | |
| 10,284,564 B1* | 5/2019 | Roundy | H04L 63/10 | |
| 10,402,546 B1* | 9/2019 | Qureshi | H04L 9/0822 | |
| 10,469,534 B2* | 11/2019 | Qureshi | H04L 63/20 | |
| 11,134,104 B2* | 9/2021 | Qureshi | H04L 63/0471 | |
| 11,601,700 B2* | 3/2023 | Matthews | H04W 12/65 | |
| 2003/0177389 A1* | 9/2003 | Albert | H04L 63/20 | 726/1 |
| 2006/0272014 A1* | 11/2006 | McRae | H04L 63/1416 | 726/12 |
| 2007/0143851 A1* | 6/2007 | Nicodemus | H04L 63/1433 | 726/4 |
| 2008/0228942 A1* | 9/2008 | Lor | H04L 63/108 | 709/238 |
| 2009/0022152 A1* | 1/2009 | Henry | H04L 63/0815 | 370/389 |
| 2009/0328186 A1* | 12/2009 | Pollutro | H04L 63/0838 | 726/13 |
| 2012/0254944 A1* | 10/2012 | Kamat | H04L 63/0281 | 726/3 |
| 2013/0055336 A1* | 2/2013 | Li | H04L 63/10 | 726/1 |
| 2013/0254833 A1* | 9/2013 | Nicodemus | G06F 21/577 | 726/1 |
| 2014/0006347 A1* | 1/2014 | Qureshi | H04W 12/06 | 707/783 |
| 2014/0006772 A1* | 1/2014 | Qureshi | G06F 8/53 | 713/150 |
| 2014/0007048 A1* | 1/2014 | Qureshi | H04L 9/0891 | 717/110 |
| 2014/0007182 A1* | 1/2014 | Qureshi | G06F 21/6218 | 726/1 |
| 2014/0007183 A1* | 1/2014 | Qureshi | H04L 63/0428 | 726/1 |
| 2014/0007192 A1* | 1/2014 | Qureshi | H04W 12/30 | 726/3 |
| 2014/0007193 A1* | 1/2014 | Qureshi | H04W 12/30 | 726/3 |
| 2014/0007214 A1* | 1/2014 | Qureshi | G06F 21/14 | 726/3 |
| 2014/0007222 A1* | 1/2014 | Qureshi | H04L 67/10 | 726/16 |
| 2014/0215558 A1* | 7/2014 | Hoyos | H04L 63/107 | 726/3 |
| 2014/0215575 A1* | 7/2014 | Hoyos | H04L 63/105 | 726/4 |
| 2015/0096010 A1* | 4/2015 | Pollutro | H04L 63/10 | 726/13 |
| 2015/0229651 A1* | 8/2015 | Nicodemus | H04L 67/10 | 726/1 |
| 2016/0099972 A1* | 4/2016 | Qureshi | H04L 67/10 | 726/1 |
| 2017/0201545 A1* | 7/2017 | Nicodemus | H04L 63/102 | |
| 2019/0238592 A1* | 8/2019 | Qureshi | G06F 21/53 | |
| 2019/0258781 A1* | 8/2019 | Qureshi | H04W 12/64 | |

OTHER PUBLICATIONS

"Mid-Year Threat Landscape Report"; Bitdefender; 2020; 76 pages.

Scott Clark; "Now Is the Time to Replace VPN With Zero Trust"; https://www.reworked.co/information-management/now-is-the-time-to-replace-vpn-with-zero-trust/; Nov. 2020; accessed Sep. 13, 2021; 13 pages.

Sharon Shea; "software-defined perimeter (SPD"; https://searchcloudsecurity.techtarget.com/definition/software-defined-perimeter-SDP?_ga=2.38013473.348367487.1609169631-923679045.1609169631; Search Cloud Security; accessed Sep. 13, 2021; 9 pages.

* cited by examiner

SECURING CORPORATE ASSETS IN THE HOME

BACKGROUND

Securing corporate assets in the home has become an increasing important issue as more employees work from home. Reports of ransomware increased seven-fold in the first half of 2020; attacks on internet of things (IoT) devices increased by 46% from January to June 2020. As the US economy moves from manufacturing to service, the information stored on company resources in the home (e.g., designs, datasets, and plans) is increasing in value.

Conventionally, corporate assets are secured through secure credentials, anti-virus software, and data encryption. The home network is typically less secure than a corporate network and more vulnerable to attack. Further, the number of devices in the home with access to and from the internet is increasing in number and sophistication (e.g., smart speakers or smart thermostats), providing more avenues of attack. In 2019, the average household had an average of 11 connected devices.

This background information is provided to reveal information believed by the applicant to be of possible relevance. No admission is necessarily intended, nor should be construed, that any of the preceding information constitutes prior art.

SUMMARY

A system is described whereby corporate assets, such as printer, computer, or internet of things device, may be secured on a home network. In an example, an apparatus, such as a smart home gateway, may include a processor and a memory coupled with the processor that effectuates operations. The operations may include creating a secured connection between a home network and a remote corporate network via a smart home gateway; detecting a plurality of devices are connected with the smart home gateway, wherein the plurality of devices are within the home network; determining that a first device of the plurality of devices is indicated as an authorized corporate device; determining that the first device has software updated to a threshold version of software; and based on the indication that the first device is an authorized corporate device or the first device has software update to the threshold version of software, automatically connecting the first device to the remote corporate network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Corporations may implement stricter security measures and technologies to protect corporate assets in the home. These measures may include: software-based firewalls for the home; intrusion detection software; vulnerability scanning of personal equipment and software; alerting of attacks; deactivation of some devices during working hours; or extending the corporate virtual private network (VPN). Disclosed herein are methods and systems for the creation of home-based VPNs with federated trust with a corporate VPN.

Figure 1:
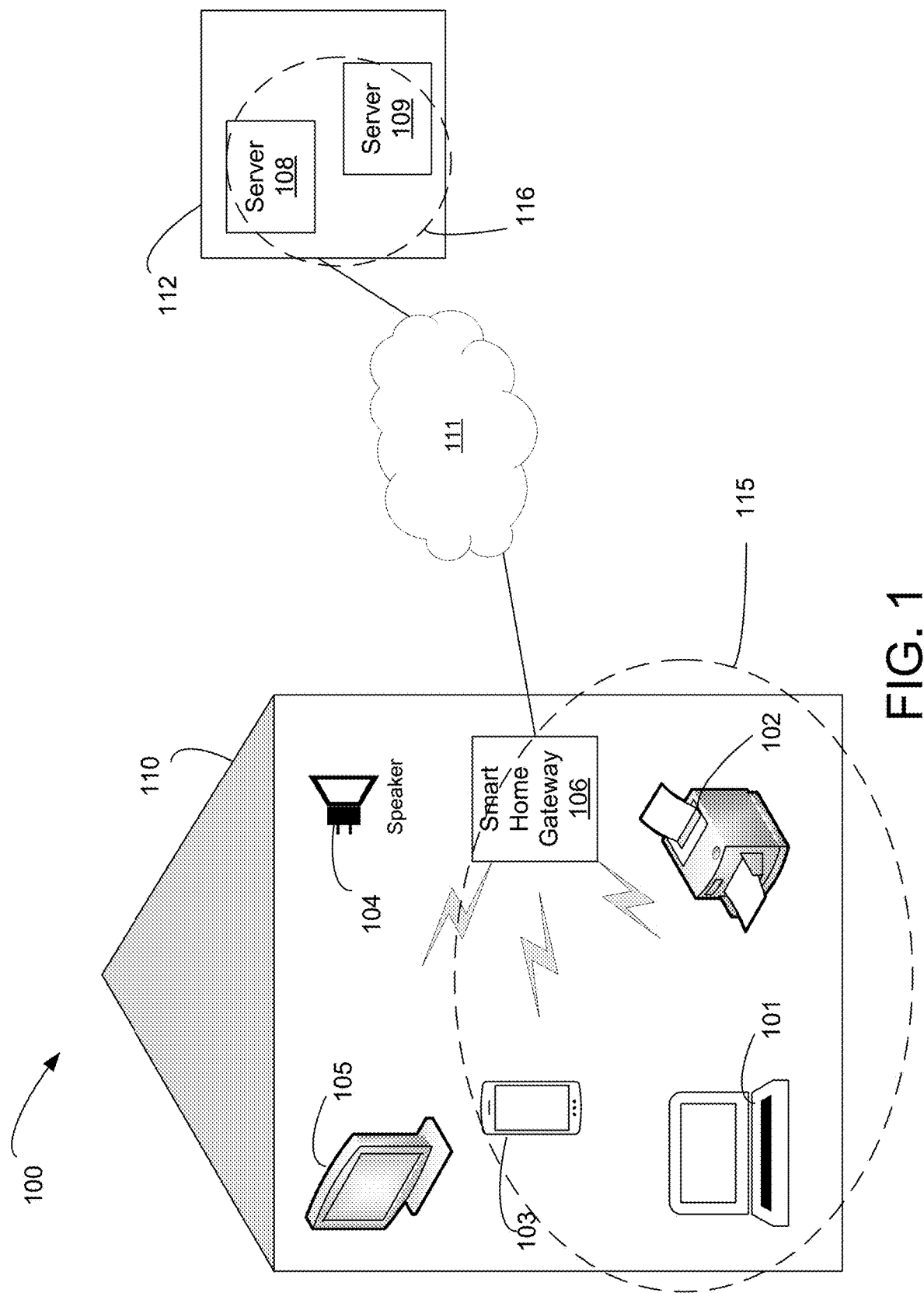
FIG. 1 illustrates an exemplary system to dynamically secure corporate assets in the home.

FIG. 1 illustrates an exemplary system to dynamically secure corporate assets in the home, among other things. System 100 may include multiple networks, such as network 111. Home 110 (i.e., home network 110) may include several different network connected devices, such as computer 101, printer 102, mobile device 103, smart speaker 104, smart television 105, or smart home gateway 106. Smart home gateway 106 may be communicatively connected with network 111 and corporate site 112 (i.e., corporate network 112). Corporate site 112 may include multiple devices (e.g., server 108 or server 109) associated with the work of a user residing at home 110. The devices of system 100 may be communicatively connected with each other. Corporate site 112 may include its own Routers, access points, DNS servers, firewalls, or the like. The devices may be physical devices or virtual devices.

Figure 2:
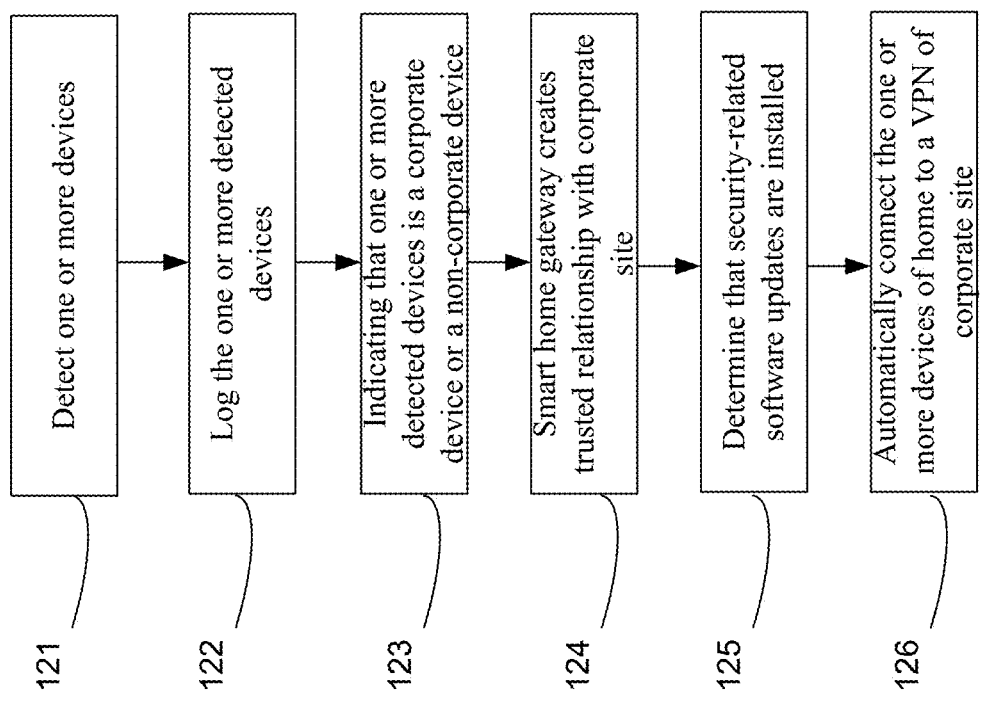
FIG. 2 illustrates an exemplary method to dynamically secure corporate assets in the home.

FIG. 2 illustrates an exemplary method to dynamically secure corporate assets in the home. At step 121, detect one or more devices that are located within home 110 and connected with smart home gateway 106. The smart home gateway may keep track of the devices and the networks they are on—wireless networks as well as virtual private networks. Note that there can be multiple virtual private networks in the home, say for a husband and wife working from home. At step 122, log the one or more detected devices. For example, the one or more detected devices may be included in a list, which may be on smart home gateway 106. At step 123, an indication of whether one or more detected devices is a corporate device or a non-corporate device may be provided. There may be a device that already has a trusted relationship (e.g., mobile device 103) and as other devices are detected, the user of mobile device 103 may be able to determine (or suggest) what devices are approved to connect with corporate site 112. Corporate information technology personnel may "confirm" or not the approval by the user of mobile device 103. There may be a pre-approved list of types of devices (e.g., printers). Devices connected with a certain virtual private network may communicate with each other securely as well as insecurely with devices outside of the virtual private network, such as through a proxy. The virtual private network may be linked to a corporate VPN through a trust relationship between the smart home gateway and the remote corporate network.

With continued reference to FIG. 2, at step 124, smart home gateway 106 connects with corporate site 112 and creates a trusted relationship with the devices of corporate site 112 (e.g., server 108 or server 109). At step 125, smart home gateway 106 determines that security-related scans are performed or software updates are installed for the corporate device and non-corporate device. Corporate devices herein are devices associated with a virtual private network associated with a corporate VPN. Non-corporate devices may need updates that may indirectly affect the corporate devices or VPN. At step 126, smart home gateway 106 may automatically connect the one or more devices of home 110 to a VPN of corporate site 112 based on an indication of being a corporate (see step 123) device and security-related software updates are installed (see step 125).

Smart home gateway 106 may have many different features. In an example, smart home gateway 106 may block the use through the internet or send a turn off command to non-corporate devices based on certain factors. In another example, smart home gateway 106 may prioritize corporate traffic over non-corporate traffic (e.g., quality of service settings). Factors may include, time of day (e.g., work hours), schedule (e.g., electronic calendar scheduled video or voice call within a threshold security level), bandwidth usage, type of traffic, type of device, or destination address (e.g., a certain phone number, name, or IP address), among other things.

The disclosed subject matter helps create a virtual private network (VPN) in home 110 on which corporate assets (e.g., devices of system 100) will be placed. The VPN in home 110 (hereinafter home VPN 115) may be federated with a VPN of corporate site 112 (herein after corporate VPN 116). Corporate assets in home 110 (e.g., device indicated as corporate at step 123) may communicate with assets on the corporate VPN 116 of corporate site 112 to which they are federated as well as assets on the home VPN 115. Personal assets (e.g., non-corporate device of step 123) can operate as normal on the home network 110.

This arrangement is different than conventional arrangements in which corporate assets connect directly to the corporate VPN 116. Conventionally, other assets (e.g., printers, routers, storage devices) are not connected to the corporate VPN and are not protected or able to be used by the corporate assets while on the corporate VPN 116. As disclosed herein, corporate assets are connected through a home VPN 115 and can communicate with each other. The home VPN 115 may connect with the corporate VPN 116 through an interchange of credentials and security keys at a network level.

The arrangement may be accomplished with the use of smart home gateway 106, which can support segregation of corporate devices on home VPN 115 without requiring a separate physical network. Smart home gateway 106 may allow personal devices (e.g., smart speaker 104 or smart television 105) not on home VPN 115 to continue to communicate without VPN overhead. Internet connectivity for the devices on the home VPN 115 may be provided by corporate proxy servers, which may be in home 110.

When a new device is connected to home network 110 via smart home gateway 106, there needs to be a determination whether the new device is connected to home VPN 115 or not. Certain devices may be excluded from home VPN 115 connection because they are not certified by the corporation, which may be dictated by a policy.

In addition, there may be a requirement that the devices in home network 110 are free from viruses and malware that could be spread to the corporate network 112. Therefore, smart home gateway 106 may have the authorization to install and run detection and monitoring software, as well as upgrading software, on devices connected with home VPN 115 or home network 110 more generally. These rights may be established when a device initially joins home VPN 115 or home network 110.

Because of the increased risk of federating with home VPNs 115, access may be restricted to a subset of applications or privileges associated with the access. These restrictions may start from zero-trust to communicate with corporate VPN 116 assets, requiring additional authentication and authorization checks for connectivity and application access.

Figure 3:
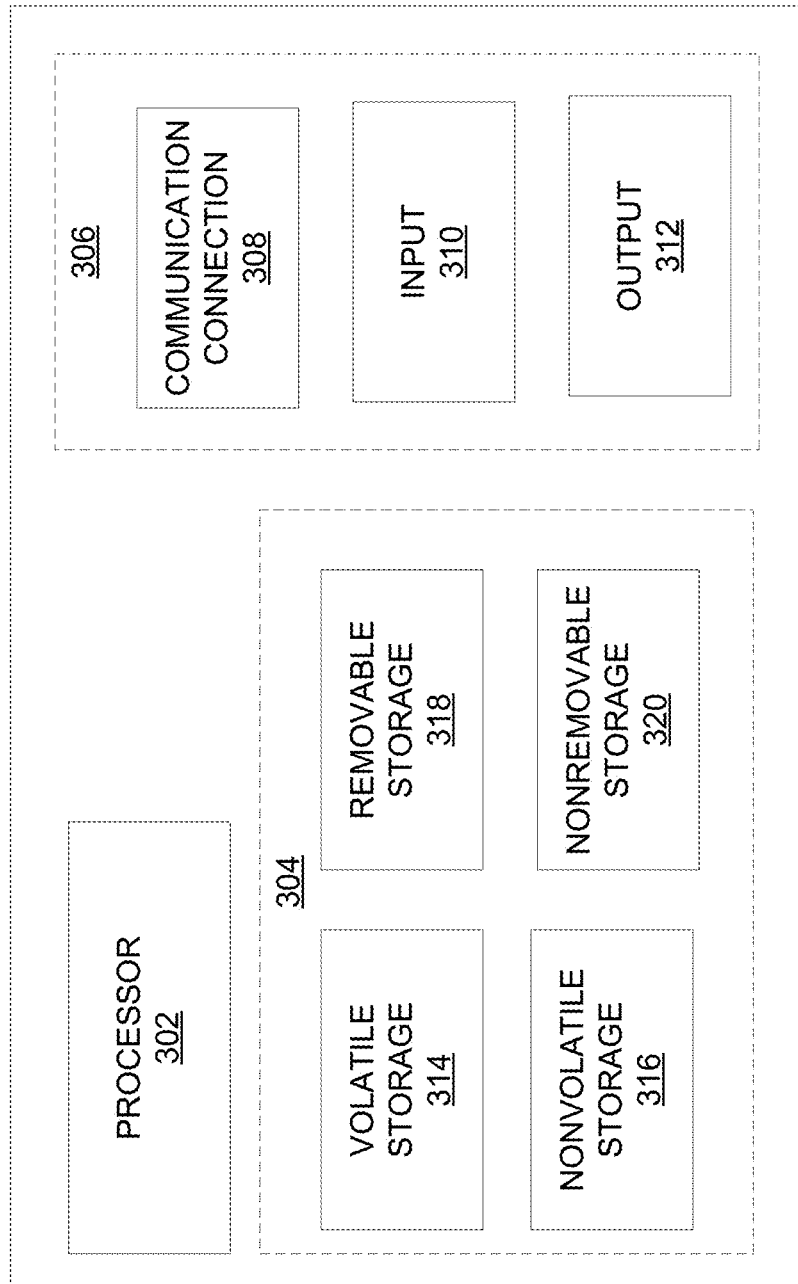
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
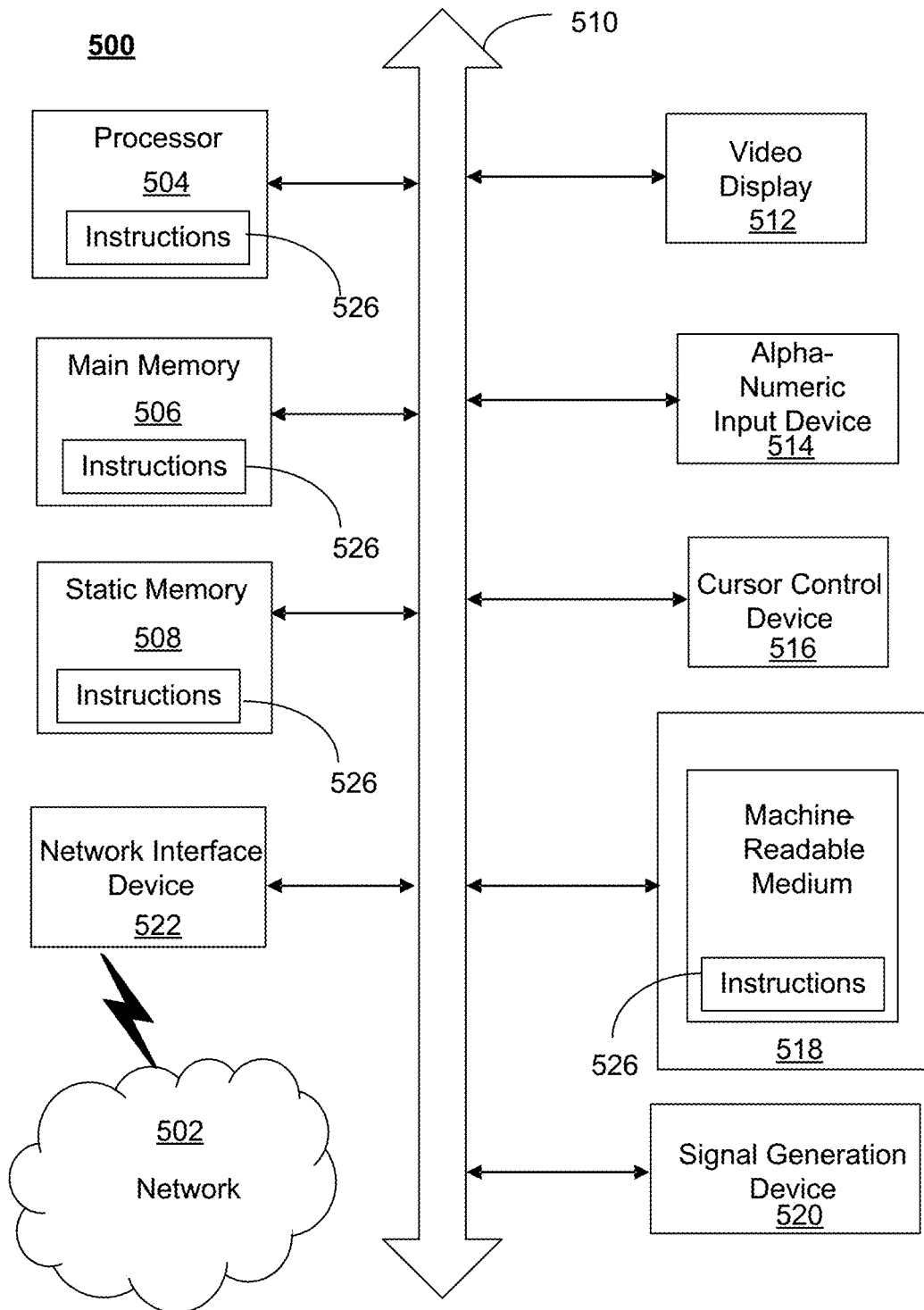
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, computer 101, printer 102, mobile device 103, smart speaker 104, smart television 105, or smart home gateway 106 and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which securing corporate assets alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—securing corporate assets—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for securing corporate assets. A method, system, computer readable storage medium, or apparatus provides for creating a secured connection (e.g., trust relationship) between a home network and a remote corporate network via a smart home gateway; detecting a plurality of devices are connected with the smart home gateway, wherein the plurality of devices are within the home network; determining that a first device of the plurality of devices is indicated as an authorized corporate device; determining that the first device has software updated to a threshold version of software; and based on the indication that the first device is an authorized corporate device or the first device has software update to the threshold version of software, automatically connecting the first device to the remote corporate network. The method, system, computer readable storage medium, or apparatus provides for sending instructions to prioritize communications of the first device on the home network based on the first device being the authorized corporate device. The method, system, computer readable storage medium, or apparatus provides for sending instructions to block communications of a second device on the home network based on the second device not being an authorized corporate device. The method, system, computer readable storage medium, or apparatus provides for sending instructions to block communications of a second device on the home network based on the second device not being an authorized corporate device, or the first device on the home network being an authorized corporate device, among other factors described herein. The determining that the first device of the plurality of devices is indicated as the authorized corporate device may be based on one or more of the factors described herein. All combinations in this paragraph (including the removal or addition of steps) are contemplated in a manner that is consistent with the other portions of the detailed description.

What is claimed:

1. A method comprising:
   creating, by a smart home gateway comprising a processor, a trusted relationship between a home network and a remote corporate network, wherein the creating the trusted relationship further comprises creating the trusted relationship through an interchange of credentials and security keys at a network level;
   detecting, by the smart home gateway, a plurality of devices connected within the home network, the plurality of devices further comprising corporate assets in communication with the remote corporate network;
   segregating, by the smart home gateway, the corporate assets on the home network;
   sending, by the smart home gateway, a turn-off command to non-corporate assets connected to the home network based on a plurality of factors including a time of day, a schedule, a bandwidth usage, a type of traffic, a type of device, a destination address, or a combination thereof;
   connecting, by the smart home gateway, a first device as a new device to the home network;
   determining, by the smart home gateway, that the first device is indicated as an authorized corporate device;
   scanning, by the smart home gateway, the first device based on a corporate policy;
   based on the corporate policy, determining, by the smart home gateway, that the first device has software updated to a threshold version of software;
   based on the determination that the first device is an authorized corporate device and the first device has software update to the threshold version of software, automatically connecting, by the smart home gateway, the first device to the remote corporate network; and
   sending, by the smart home gateway, instructions to prioritize communications of the first device on the home network based on the first device being the authorized corporate device.

2. The method of claim 1, wherein the determining that the first device is indicated as the authorized corporate device further comprises determining that the first device is indicated as the authorized corporate device based on a type of device.

3. The method of claim 1, wherein the determining that the first device is indicated as the authorized corporate device further comprises determining that the first device is indicated as the authorized corporate device based on a schedule associated with an electronic calendar.

4. The method of claim 1, wherein the sending, by the smart home gateway, the instructions to prioritize communications of the first device on the home network further comprises sending the instructions to prioritize corporate traffic over non-corporate traffic.

5. The method of claim 1, further comprising:
connecting, by the smart home gateway, a second device as a new device to the home network; and
sending, by the smart home gateway, instructions to block communications of the second device on the home network based on the second device not being an authorized corporate device.

6. The method of claim 1, wherein sending, by the smart home gateway, the instructions to prioritize communications of the first device on the home network further comprises sending the instructions to prioritize quality of service settings for the first device.

7. The method of claim 1, further comprising installing and running, by the smart home gateway, detection and monitoring software on the first device when the first device initially joins the home network.

8. An apparatus comprising:
a processor; and
a memory coupled with the processor, the memory storing executable instructions that when executed by the processor cause the processor to effectuate operations comprising:
creating a trusted relationship between a home network and a remote corporate network via a smart home gateway, wherein the creating the trusted relationship further comprises creating the trusted relationship through an interchange of credentials and security keys at a network level;
detecting a plurality of devices are connected with the smart home gateway, wherein the plurality of devices are within the home network and comprises corporate devices in communication with the remote corporate network via the smart home gateway;
segregating the corporate devices on the home network via the smart home gateway from non-corporate devices;
blocking use by or sending a turn-off command to the non-corporate devices, via the smart home gateway, based on a plurality of factors including a time of day, a schedule, a bandwidth usage, a type of traffic, a type of device, a destination address, or a combination thereof;
connecting a first device as a new device to the home network via the smart home gateway;
determining that the first device is indicated as an authorized corporate device;
scanning the first device based on a corporate policy;
based on the corporate policy, determining that the first device has software updated to a threshold version of software;
based on the determination that the first device is an authorized corporate device and the first device has software update to the threshold version of software, automatically connecting the first device to the remote corporate network; and
sending, by the smart home gateway, instructions to prioritize communications of the first device on the home network based on the first device being the authorized corporate device.

9. The apparatus of claim 8, wherein the determining that the first device is indicated as the authorized corporate device further comprises determining that the first device is indicated as the authorized corporate device based on a type of device.

10. The apparatus of claim 8, wherein the determining that the first device is indicated as the authorized corporate device further comprises determining that the first device is indicated as the authorized corporate device based on a schedule associated with an electronic calendar.

11. The apparatus of claim 8, the operations further comprising the sending instructions to prioritize communications of the first device on the home network based on the first device being the authorized corporate device further comprises sending the instructions to prioritize corporate traffic over non-corporate traffic.

12. The apparatus of claim 8, the operations further comprising:
connecting a second device as a new device to the home network; and
sending instructions to block communications of the second device on the home network based on the second device not being an authorized corporate device.

13. The apparatus of claim 8, wherein sending, by the smart home gateway, the instructions to prioritize communications of the first device on the home network further comprises sending the instructions to prioritize quality of service settings for the first device the creating the trusted relationship further comprises creating the trusted relationship through an interchange of credentials and security keys at a network level.

14. The apparatus of claim 8, the operations further comprising installing and running, by the smart home gateway, detection and monitoring software on the first device when the first device initially joins the home network.

15. A non-transitory computer readable storage medium storing computer executable instructions that when executed by a computing device cause said computing device to effectuate operations comprising:
creating a trusted relationship between a home network and a remote corporate network via a smart home gateway, wherein the creating the trusted relationship further comprises creating the trusted relationship through an interchange of credentials and security keys at a network level;
detecting a plurality of devices are connected with the smart home gateway, wherein the plurality of devices are within the home network and comprises corporate devices in communication with the remote corporate network via the smart home gateway;
segregating the corporate devices on the home network via the smart home gateway from non-corporate devices;
prioritizing, via the smart home gateway, corporate traffic associated with the corporate devices over non-corporate traffic associated with the non-corporate devices, via the smart home gateway, based on a plurality of factors including a time of day, a schedule, a bandwidth usage, a type of traffic, a type of device, a destination address, or a combination thereof;
connecting a first device as a new device to the home network via the smart home gateway;
determining that a first device is indicated as an authorized corporate device;
scanning the first device based on a corporate policy;
based on the corporate policy, determining that the first device has software updated to a threshold version of software;
based on the determination that the first device is an authorized corporate device and the first device has software update to the threshold version of software, automatically connecting the first device to the remote corporate network; and
sending, by the smart home gateway, instructions to prioritize communications of the first device on the home network based on the first device being the authorized corporate device.

16. The non-transitory computer readable storage medium of claim 15, wherein the automatically connecting the first device further comprises accessing applications of the remote corporate network based on privileges associated with the access by the first device.

17. The non-transitory computer readable storage medium of claim 15, wherein the segregating the corporate devices on the home network further comprises segregating the corporate devices on the home network without requiring a separate physical network.

18. The non-transitory computer readable storage medium of claim 17, wherein the operations further comprising providing internet connectivity for the plurality of devices using corporate proxy servers.

19. The non-transitory computer readable storage medium of claim 15, wherein the operations further comprising:
connecting a second device as a new device to the home network; and
sending instructions to block communications of the second device on the home network based on the second device not being an authorized corporate device and the first device on the home network being an authorized corporate device.

20. The non-transitory computer readable storage medium of claim 15, the operations further comprising installing and running detection and monitoring software and upgrading software on the first device when the first device initially joins the home network.

* * * * *